US009016266B2

(12) United States Patent
Nowak et al.

(10) Patent No.: US 9,016,266 B2
(45) Date of Patent: Apr. 28, 2015

(54) VALVE DEVICE FOR AN INTERNAL COMBUSTION ENGINE

(75) Inventors: Martin Nowak, Leverkusen (DE); Andreas Koester, Essen (DE); Andres Toennesmann, Aachen (DE); Heinrich Dismon, Gangelt (DE)

(73) Assignee: Pierburg GmbH, Neuss (DE)

( * ) Notice: Subject to any disclaimer, the term of this patent is extended or adjusted under 35 U.S.C. 154(b) by 231 days.

(21) Appl. No.: 13/511,373

(22) PCT Filed: Nov. 23, 2010

(86) PCT No.: PCT/EP2010/068019

§ 371 (c)(1), (2), (4) Date: May 23, 2012

(87) PCT Pub. No.: WO2011/067138

PCT Pub. Date: Jun. 9, 2011

(65) Prior Publication Data

US 2012/0285411 A1 Nov. 15, 2012

(30) Foreign Application Priority Data

Dec. 1, 2009 (DE) ........................ 10 2009 056 251

(51) Int. Cl.
*F02M 25/07* (2006.01)

(52) U.S. Cl.
CPC ....... *F02M 25/0773* (2013.01); *F02M 25/0771* (2013.01); *F02M 25/0772* (2013.01); *F02M 25/0789* (2013.01); *Y02T 10/121* (2013.01)

(58) Field of Classification Search
CPC ............... F01L 3/00; F01L 1/04; F01L 1/042; F16K 1/00; F02M 25/077; F02M 25/0771; F02M 25/0772; F02M 25/0773; F02M 25/0794
USPC ................. 123/188.2, 188.16, 190.1, 568.21, 123/568.23, 568.26
See application file for complete search history.

(56) References Cited

U.S. PATENT DOCUMENTS

| | | | | |
|---|---|---|---|---|
| 5,937,835 | A * | 8/1999 | Turner et al. | 123/568.24 |
| 6,443,135 | B1 * | 9/2002 | Dismon et al. | 123/568.18 |
| 2007/0199549 | A1 | 8/2007 | Weisz | |
| 2008/0029073 | A1 * | 2/2008 | Klipfel et al. | 123/568.11 |
| 2011/0114211 | A1 * | 5/2011 | Leroux et al. | 137/625.45 |

FOREIGN PATENT DOCUMENTS

| | | | |
|---|---|---|---|
| EP | 0 887 540 | A2 | 12/1998 |
| EP | 1 091 112 | A2 | 4/2001 |
| EP | 1 362 985 | A2 | 11/2003 |
| EP | 1 826 391 | A2 | 8/2007 |
| EP | 1 882 843 | A2 | 1/2008 |

* cited by examiner

*Primary Examiner* — Lindsay Low
*Assistant Examiner* — Jacob Amick
(74) *Attorney, Agent, or Firm* — Norman B. Thot

(57) ABSTRACT

A valve device for an internal combustion engine includes a multi-part housing. A drive unit generates a rotational moment. The drive unit is arranged in a motor chamber. A transmission unit is arranged in a transmission chamber. An eccentric is configured to be driven by the transmission unit. A valve rod is configured to be displaceable in translation. The valve rod extends into a valve rod displacement chamber. A coupling element converts a displacement of the eccentric into a translational displacement of the valve rod. A valve seat is arranged between an inlet and an outlet. A valve closing body is attached to the valve rod. The valve closing body is configured to be lowered onto the valve seat and lifted off the valve seat. A cover is disposed between the eccentric and the coupling element. The cover is configured to separate the transmission chamber from the valve rod displacement chamber.

16 Claims, 3 Drawing Sheets

VALVE DEVICE FOR AN INTERNAL COMBUSTION ENGINE

CROSS REFERENCE TO PRIOR APPLICATIONS

This application is a U.S. National Phase application under 35 U.S.C. §371 of International Application No. PCT/EP2010/068019, filed on Nov. 23, 2010 and which claims benefit to German Patent Application No. 10 2009 056 251.6, filed on Dec. 1, 2009. The International Application was published in German on Jun. 9, 2011 as WO 2011/067138 A1 under PCT Article 21(2).

FIELD

The present invention relates to a valve device for an internal combustion engine, comprising a multi-part housing, a drive unit generating a rotational moment and arranged in an motor chamber, a transmission unit arranged in a transmission chamber, an eccentric that can be driven by means of the transmission unit, a valve rod that is displaceable in translation, said valve rod extending into a valve rod moving chamber, a coupling element by means of which the displacement of the eccentric can be converted into a translational displacement of the valve rod, a valve seat between an inlet and an outlet, and a valve closing body that is attached to the valve rod and can be lowered onto the valve seat and be lifted off the valve seat.

BACKGROUND

Such valve devices are used particularly as exhaust gas return valves. Via the drive unit, which in most cases is of the electromotive type, a transmission unit will be set into rotary movement, said transmission unit comprising a coupling element by which the rotary movement of the gears will be converted into a translatory movement of the valve rod. By means of these valves, an exhaust gas flow being returned from the exhaust manifold to the suction tube for thus reducing the emission of pollutants, can be controlled over a wide range. The electromotively driven valves with the intermediate transmission have a high control accuracy. Exhaust gas return valves are, however, subjected to high thermal stress and progressive contamination in their exhaust gas region.

EP 0 887 540 B1 describes an exhaust gas return valve wherein a gear transmission is driven by an electric motor. The last gear of the transmission comprises a guide opening with a pin extending into it, said pin being fixedly connected to the valve rod and extending vertically to it. Upon rotation of a drive gear, the pin will be displaced in the guide opening, resulting in a translatory movement, guided by the housing, of a rod actuating the valve. Ingress of blow-by gases into the transmission chamber is prevented in that the valve rod is divided into two axially superposed portions which are connected to each other by an attachment member, the outer side of said attachment member having a membrane arranged on it.

Even though such an arrangement does prevent an ingress of blow-by gases, the arrangement is very complex in regard to the number of component parts and also to the assembly process. There is also an increased space requirement.

EP 1 091 112 B1 describes an exhaust gas return valve with a planetary gear set. The last gear of this transmission is supported on an output shaft having an eccentric arranged on its opposite end. Said eccentric is connected to an axis which upon actuation of the drive motor will perform a circulating movement about a rotary axis. Arranged on said axis is a ball bearing, running in a slotted guide portion of a coupling element fixedly connected to the valve rod. The transmission chamber is closed by a pot-shaped cover having the rotary axis extending out therefrom and being connected to a further housing portion by bolts.

This arrangement prevents an ingress of blow-by gases into the transmission while, however, its opening towards the valve rod displacement chamber is located exactly in the region of the rotating axis so that the latter, being a particularly sensitive component, will still be affected by the hot exhaust gas. Due to the planetary gear set and the adjacent eccentric, the axial constructional space of such a valve is also relatively large.

SUMMARY

An aspect of the present invention to provide a valve device by which an ingress of contamination into a transmission and particularly into the sensitive rotating parts of the transmission can be prevented to the largest extent. Another aspect of the present invention is that, at the same time, the thermal stress acting on the sensitive parts of the valve device is reduced and the required constructional space is minimized.

In an embodiment, the present invention provides a valve device for an internal combustion engine which includes a multi-part housing. A drive unit is configured to generate a rotational moment. The drive unit is arranged in a motor chamber. A transmission unit is arranged in a transmission chamber. An eccentric is configured to be driven by the transmission unit. A valve rod is configured to be displaceable in translation. The valve rod extends into a valve rod displacement chamber. A coupling element is configured to convert a displacement of the eccentric into a translational displacement of the valve rod. A valve seat is arranged between an inlet and an outlet. A valve closing body is attached to the valve rod. The valve closing body is configured to be lowered onto the valve seat and lifted off the valve seat. A cover is disposed between the eccentric and the coupling element. The cover is configured to separate the transmission chamber from the valve rod displacement chamber. The eccentric is thus arranged with its rotary axis in the encapsulated transmission chamber. In comparison to known arrangements, the rotary axis is thus given added protection against intruding blow-by gases.

BRIEF DESCRIPTION OF THE DRAWINGS

The present invention is described in greater detail below on the basis of embodiments and of the drawings in which.

DETAILED DESCRIPTION

Figure 1:
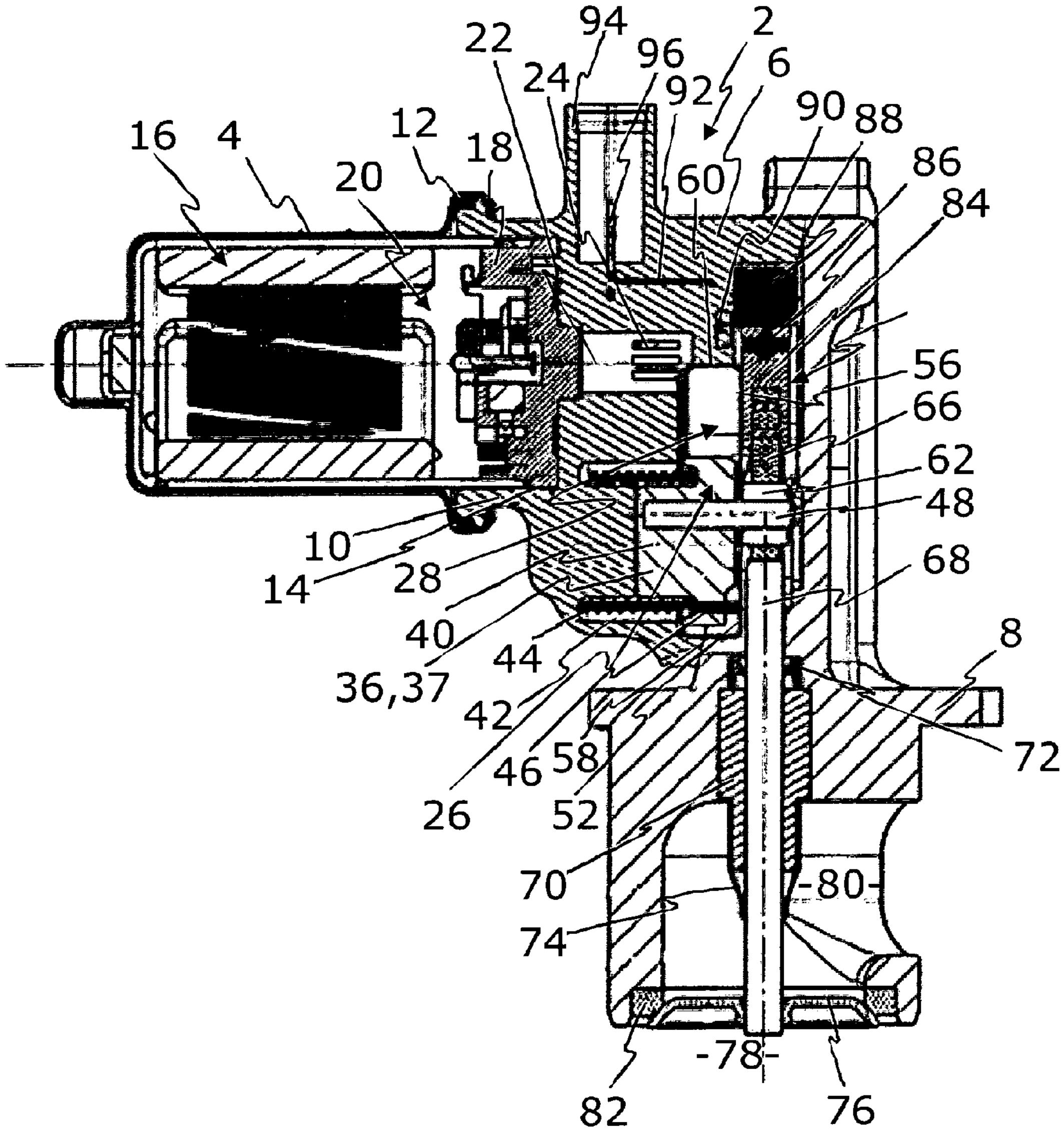
FIG. 1 shows a sectional lateral view of a valve device of the present invention.

In an embodiment of the present invention, a motor cap can, for example, be arranged in a receiving portion of the housing, said motor cap separating the transmission chamber from the motor chamber. In this manner, ingress of burned or abraded brush particles from the motor chamber into the transmission chamber is prevented to the largest extent.

In an embodiment of the present invention, an axis can, for example, be fastened to the eccentric, said axis being moveable on a circular path around the rotary axis of the eccentric. This arrangement allows for an especially simple coupling to the valve rod.

A special arrangement is provided in that a drive gear of the transmission unit serves as an eccentric and said axis is arranged on the drive gear. The eccentric is consequently integrated into the drive gear, thus obviating the need for an eccentric as an additional component, with resultant reduction of the number of component parts and assembly times. In this embodiment, the drive wheel and the axis can be produced as one integral piece, or the axis can have material injection-molded around it.

In an embodiment of the present invention, the coupling element is fastened to the valve rod and comprises a slotted guide portion guiding therein a roll or bearing arranged on said axis. The rotational movement of the gear is thereby converted in a particularly simple manner into a translatory movement of the valve rod. Frictional forces are minimized so that only small actuating forces are required.

In such an arrangement, the cover can, for example, comprise an opening shaped as part of a circular arc, said opening having said axis extending therethrough. Said opening forms the sole connection between the valve rod displacement chamber and the transmission chamber and is not located in the immediate vicinity of the axes supported for rotational movement. While a relatively high shielding effect is achieved by the cover, the functionality is nonetheless provided.

In an embodiment of the present invention, the cover can, for example, be formed as a plate having outer edges bent vertically to said plate. Such a cover can be placed in the housing without additional fastening elements. In such a case, attachment is realized by form-locking engagement.

In an embodiment of the present invention, the outer edges are arranged in at least partial abutment on abutment faces of the housing which extend in the same direction. The sealing length on the outer periphery of the cover is thereby increased so that an additional flow resistance is created which will act against an intrusion of gases into the transmission chamber.

In an embodiment of the present invention, the housing comprises a pot-shaped motor housing portion, a transmission housing portion in which the transmission chamber is formed and in which the rotary axes of the gears are attached, and a valve housing portion in which the inlet and the outlet together with the valve seat are formed. This arrangement makes it possible to achieve a high sealing effect toward the outer atmosphere while allowing for a simple assembly process.

In an embodiment of the present invention, the abutment faces for the outer edges of the cover are formed on the transmission housing portion, thus preventing a displacement of the abutment faces in the housing relative to the outer edges of the cover.

A particularly advantageous embodiment of the transmission is obtained when using a spur gear transmission wherein the transmission unit comprises a drive pinion meshing with the larger gear of a double gear of which the smaller gear meshes with the output gear which is formed as a gear segment. Such a transmission, even though offering a high gear ratio, requires only little constructional space and can be easily mounted.

In an embodiment of the present invention, the transmission housing portion includes a recess concentric with the rotary axis of the output gear, said recess having arranged therein a helical spring of which the first leg is in abutment on the transmission housing portion and of which the second leg is in abutment on the output gear, such that, upon rotation of the gear from the closed position of the valve, energy for turning the output gear back into the starting position is stored in the spring. Such an arrangement makes it possible to enlarge the angle of rotation of the eccentric. This will result in a favorable force development across the angle of rotation so that, in the extreme positions, high forces can be applied to break loose the valve or to overcome differences in pressure.

In an embodiment of the present invention, the transmission housing portion can comprise a lead frame injection-molded into it, said lead frame comprising connection pins of a plug formed on the transmission housing portion, of a sensor and of the drive unit. The electric supply to the valve and the positional feedback can thus be safeguarded throughout the lifespan because a detachment of contacts due to vibrations of the valve is excluded.

An additional sealing effect already in the transition between the exhaust-conducting region and the valve rod displacement chamber is obtained in that the valve rod is guided, via a guiding element, for translatory movement in the housing, and that a sealing element is arranged on the valve rod between the guiding element and the coupling element.

By providing a contour on the transmission housing portion, which contour serves for guiding the coupling element, twisting of the coupling element and thus the valve rod is prevented.

There is thus created a valve device which is largely resistant to contamination particularly by blow-by gases and to thermal stresses and, further, while offering high actuating accuracy, requires only little constructional space and consequently is inexpensive in production.

The valve device illustrated in FIG. 1 comprises a multipart housing 2 composed of a pot-shaped motor housing portion 4, a transmission housing portion 6 and a valve housing portion 8.

The transmission housing portion 6 is, on its first side, provided with an annular projection 10 on whose outer periphery, with interposition of a sealing 12, the motor housing portion 4 is fastened and whose inner periphery forms a receiving portion 14 into which an electric motor is inserted as a drive unit 16. On its end facing toward the transmission housing portion 6, the electric motor 16 is largely closed by a motor cap 18, so that a motor chamber 20 is separated from the transmission housing portion 6. Only a drive shaft 22, with a drive pinion 24 of a transmission unit 26 arranged thereon for common rotation therewith, and two motor connector terminals, not shown, extend through corresponding opening of motor cap 18.

Within the transmission housing portion 6, transmission unit 26 is arranged and supported in a transmission chamber 28. Said transmission unit comprises a drive pinion 24 meshing with the larger gear 30 of a double gear 32 of which the smaller gear 34 meshes with an output gear 36 which is formed as a gear segment, as can be seen particularly in FIG. 3. Said double gear 32, as also holds true for the output gear 36, is supported on an axial bolt which serves as a rotary axis 38,40 and which is fastened in the transmission housing portion 6.

In transmission chamber 28, there is further formed an annular recess 42 which is arranged concentrically with the rotary axis of the output gear 36, said recess having arranged therein a helical spring 44, biased in the direction of rotation, wherein the first leg of said spring, not visible in the drawings, is in abutment against the transmission housing portion 6 and the second spring leg 46 is in abutment on the output gear 36. Upon rotation of the output gear 36 from its starting position, said spring will be further twisted, so that spring 44 can be used as a return spring which will turn the drive unit 26 in a known manner back into its starting position, e.g. in case that the drive unit 16 should fail.

On output gear 36, outside of rotary axis 40, an axis 48 is arranged which extends parallel to rotary axis 40 and, upon rotation of output gear 36, will be moved on a segment of a circle around rotary axis 40. Said axis 48 can be provided with injection-molded material around it during manufacture of output gear 36 or can be produced in one piece with the latter, or be attached to gear 36 in another manner. Accordingly, output gear 36 will also act as an eccentric 37 so that no additional eccentric component will be required.

Said axis 48 extends through an opening 50, also formed as a segment of a circle, of a cover 52 which according to the present invention separates the transmission chamber 28 from a valve rod displacement chamber 54 into which the axis 48 extends.

Figure 3:
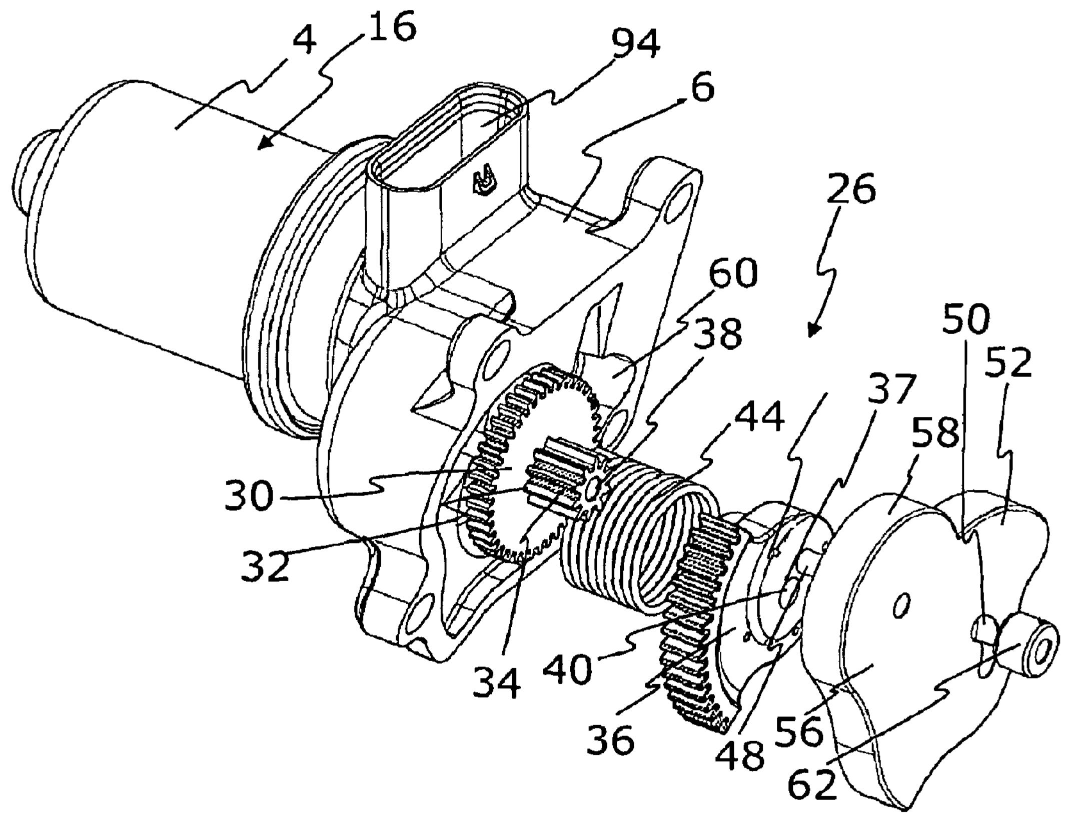
FIG. 3 shows a perspective view of the transmission unit and of the drive unit of the valve device of the present invention shown in FIG. 1, with parts of the transmission unit being represented in an exploded view.

Cover 52, its shape being shown in FIG. 3, is substantially formed as a flat plate 56, with outer edges 58 extending from said plate at an angle of 90° thereto. Said outer edges 58 are in abutment on correspondingly shaped abutment faces 60 of transmission housing portion 6, resulting in a form-locked attachment in transmission housing portion 6 without the need for additional fastening elements. This extended abutment area further increases the sealing tightness of transmission chamber 28 which on a first side thereof is separated from its ambience by motor cap 18, and on the opposite side by cover 52. A connection exists only by way of the openings 50 through which extend the shafts 22 and respectively the axes 48 for drive transmission out from and respectively into transmission chamber 28.

Figure 2:
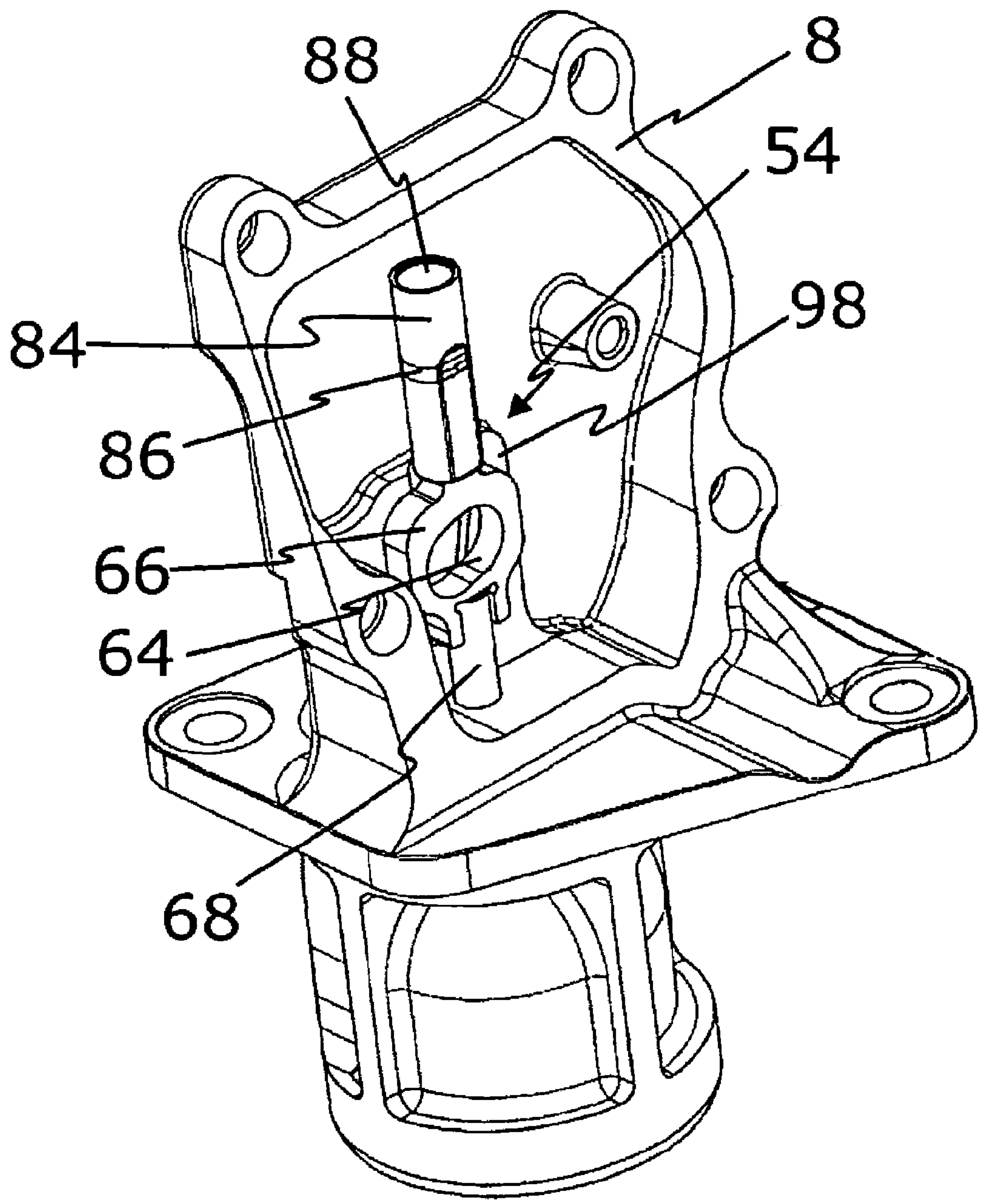
FIG. 2 shows a perspective view of the valve assembly.

In the valve rod displacement chamber 54, axis 48 has arranged on it a roll 62 guided in a slotted guide portion 64 of a coupling element 66, the latter in turn being fixedly connected to a valve rod 68 of the valve device. The slotted guide portion 64, which is shown in FIG. 2, can have a curved shape for realizing special required force/stroke developments.

Valve rod 68 extends through a corresponding opening of the valve housing portion 8 in which a guide element 70 is arranged for supporting the valve rod 68 in a manner allowing only for a pure lifting movement. Between said guide element 70 and the valve rod displacement chamber, a sealing element 72 is arranged in the valve housing portion 8, surrounding the valve rod 68 and significantly reducing a blow-by gas flow entering the valve rod displacement chamber 54 along valve rod 68. Arranged on the opposite end of the guide element, again surrounding the valve rod, is a shielding element 74 which will detach depositions on valve rod 68 and also improve the sealing effect on valve rod 68.

To the end of valve rod 68, there is fastened in a known manner a valve closing body 76 which in the illustrated position separates an inlet 78 of the valve from an outlet 80. For this purpose, the valve closing body is resting on a valve seat 82.

On the opposite axial end of valve rod 68, beyond coupling element 66, a carrier element 84 is fastened to the coupling element 66, said carrier element being arranged for movement together with the valve rod 68. Carrier element 84 comprises a ceramic insulating body 86 which extends across the cross section of carrier element 84, thus creating a thermal separation between the valve rod, which in the given case may be subjected to high thermal stress, and the part of the carrier element 84 arranged beyond insulating body 86. In this thermally separated region, carrier element 84 comprises an opening in which a permanent magnet 88 is fastened. This magnet communicates with a contactless sensor 90 which is arranged, with material injection-molded around it, in the transmission housing portion 6 parallel to the direction of movement of carrier element 84 adjacent to the latter.

Sensor 90 is connected via a lead frame 92 to a plug 94 whose connector pins 96 are formed by the ends of the lead frame 92. Further lines of the lead frame 92 serve as motor connectors which will be plugged together with motor contacts so that both the controlling of drive unit 16 and the positional feedback of the valve device can be performed via plug 94. During the manufacturing process, lead frame 92 will be placed into the injection mold of transmission housing portion 6 and by injection molding enclosed with material around it, thus reliably preventing detachment of the electrical contacts.

If, now, it is desired to at least partially open the connection from inlet 78 to outlet 80, a required voltage will be supplied by a control unit via the connector pins 96 of plug 94 of drive unit 16. By rotating the drive unit 16, the transmission unit 26 and thus also the drive gear 36 will be caused to rotate. Thereby, axis 48 will be rotated on circular arc around rotary axis 40, with resultant movement of roll 62 in slotted guide portion 64. Enforced thereby is a translatory movement of coupling element 66 and consequently of valve rod 68 and valve closing body 76 which will be lifted off the valve seat 82 so that a gas flow can stream from inlet 78 to outlet 80. During this movement, twisting of valve rod 68 will be prevented by a contour 98 on valve housing portion 8, as evident from FIG. 2.

In the process, the position of the valve closing body 76 will be fed back in a known manner via plug 94 by means of the magnetic field which, on sensor 90, is changed by the movement of permanent magnet 88 with carrier element 84, so that, once the desired position has been reached, the drive unit will be switched off.

In the region of outlet 80, pressure pulsations are occurring which have the effect that, in spite of the sealing element 72, blow-by gases will enter the valve rod displacement chamber 54 along valve rod 68. Ingress of these gases into the transmission chamber, however, can be prevented in large part by the additional cover 52. Particularly, the opening 50 of cover 52 is not arranged directly opposite a rotatably supported part of transmission 26 so that a predominant intrusion of the gas which is nonetheless reaching the transmission chamber 28 will also have lesser consequences.

While being highly unaffected by contamination, this valve device requires only little constructional space. Assembly will be simple while also the number of constructional parts has been minimized, which allows for a distinct cost reduction and an increased useful life.

The present invention is not limited to embodiments described herein; reference should be had to the appended claims.

What is claimed is:

1. A valve device for an internal combustion engine, the valve device comprising:

a multi-part housing;

a drive unit configured to generate a rotational moment, the drive unit being arranged in a motor chamber;

a transmission unit arranged in a transmission chamber;

an eccentric configured to be driven by the transmission unit;

a valve rod configured to be displaceable in translation, the valve rod extending into a valve rod displacement chamber;

a coupling element configured to convert a displacement of the eccentric into a translational displacement of the valve rod;

a valve seat arranged between an inlet and an outlet;

a valve closing body attached to the valve rod, the valve closing body being configured to be lowered onto the valve seat and lifted off the valve seat;

wherein, a cover is disposed between the eccentric and the coupling element, the cover being configured to separate the transmission chamber from the valve rod displacement chamber; and a pin is arranged on an output gear outside of a rotary axis, the pin being configured to extend parallel to the rotary axis so that, upon a rotation of the output gear, the pin is moved on a segment of a circle around the rotary axis.

2. The valve device for an internal combustion engine as recited in claim 1, wherein the multi-part housing comprises a receiving portion, and further comprising a motor cap arranged in the receiving portion of the multi-part housing, the motor cap being configured to separate the transmission chamber from the motor chamber.

3. The valve device for an internal combustion engine as recited in claim 1, wherein the eccentric comprises an axis of rotation, and further comprising an axis attached to the eccentric, wherein the axis is configured to move on a circular path around the axis of rotation of the eccentric.

4. The valve device for an internal combustion engine as recited in claim 3, wherein the transmission unit comprises an output gear, the output gear being configured to serve as the eccentric, and wherein the axis is arranged on the output gear.

5. The valve device for an internal combustion engine as recited in claim 1, wherein the coupling element is fastened to the valve rod, and the coupling element comprises a slotted guide portion, the slotted guide portion being configured to guide a roll or a bearing in the slotted guide portion, the roll or the bearing being arranged on the axis.

6. The valve device for an internal combustion engine as recited in claim 1, wherein the cover comprises an opening shaped as a part of a circular arc, the opening being configured so that the axis extends through the opening.

7. The valve device for an internal combustion engine as recited in claim 1, wherein the cover is formed as a plate with outer edges which are bent vertically with respect to the plate.

8. The valve device for an internal combustion engine as recited in claim 7, wherein the multi-part housing comprises abutment faces, and wherein the outer edges are arranged in at least partial abutment on the abutment faces of the multi-part housing extending in a same direction.

9. The valve device for an internal combustion engine as recited in claim 7, wherein the multi-part housing comprises a pot-shaped motor housing portion, a transmission housing portion in which the transmission chamber is formed and in which a rotary axis of a double gear and a rotary axis of an output gear are attached, and a valve housing portion in which the inlet and the outlet are formed together with the valve seat.

10. The valve device for an internal combustion engine as recited in claim 9, further comprising a transmission housing portion, wherein the abutment faces for the outer edges of the cover are formed on the transmission housing portion.

11. The valve device for an internal combustion engine as recited in claim 9, wherein the double gear comprises a larger gear and a smaller gear, and the transmission unit comprises a drive pinion, wherein the drive pinion is configured to mesh with the larger gear of the double gear, and the smaller gear of the double gear is configured to mesh with the output gear, the output gear being formed as a gear segment.

12. The valve device for an internal combustion engine as recited in claim 9, wherein the transmission housing portion comprises a recess concentric with the rotary axis of the output gear, the recess comprising a helical spring with a first leg and a second leg arranged in the recess, wherein the first leg of the helical spring abuts on the transmission housing portion and the second leg of the helical spring abuts on the output gear so that, upon rotation of the output gear from a closed position of the valve device, an energy for turning the output gear back into a starting position is stored in the helical spring.

13. The valve device for an internal combustion engine as recited in claim 9, wherein the transmission housing portion comprises a lead frame which is injection-molded into the transmission housing portion, wherein the lead frame comprises connection pins of a plug formed on the transmission housing portion, of a sensor, and of the drive unit.

14. The valve device for an internal combustion engine as recited in claim 9, further comprising a guiding element, and a sealing element arranged on the valve rod between the guiding element and the coupling element, wherein the valve rod is configured to be guided via the guiding element for a translatory movement in the multi-part housing.

15. The valve device for an internal combustion engine as recited in claim 9, wherein the transmission housing portion is formed with a contour which is configured to guide the coupling element.

16. A valve device for an internal combustion engine, the valve device comprising:

a multi-part housing;

a drive unit configured to generate a rotational moment, the drive unit being arranged in a motor chamber;

a transmission unit arranged in a transmission chamber;

an eccentric configured to be driven by the transmission unit;

a valve rod configured to be displaceable in translation, the valve rod extending into a valve rod displacement chamber;

a coupling element configured to convert a displacement of the eccentric into a translational displacement of the valve rod;

a valve seat arranged between an inlet and an outlet; and a valve closing body attached to the valve rod, the valve closing body being configured to be lowered onto the valve seat and lifted off the valve seat;

wherein, a cover is disposed between the eccentric and the coupling element, the cover being configured to separate the transmission chamber from the valve rod displacement chamber, and a pin is arranged on an output gear outside of a rotary axis so as to extend through an opening of the cover in a direction of the coupling element, the pin being configured to extend parallel to the rotary axis so that, upon a rotation of the output gear, the pin is moved on a segment of a circle around the rotary axis.

* * * * *